US007082465B1

(12) United States Patent
Martin et al.

(10) Patent No.: US 7,082,465 B1
(45) Date of Patent: Jul. 25, 2006

(54) WEB BASED MANAGEMENT OF HOST COMPUTERS IN AN OPEN PROTOCOL NETWORK

(75) Inventors: Steven J. Martin, Richmond, VA (US); Ryan Alan Danner, Glen Allen, VA (US); Tin Thanh Dang, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 835 days.

(21) Appl. No.: 09/817,055

(22) Filed: Mar. 27, 2001

(51) Int. Cl.
*G06F 15/173* (2006.01)

(52) U.S. Cl. .................... 709/224; 709/225; 718/104

(58) Field of Classification Search ............... 709/221, 709/223, 224, 220, 206, 225; 707/10, 200; 702/182; 379/67.1; 714/47; 718/104
See application file for complete search history.

(56) References Cited

U.S. PATENT DOCUMENTS

| | | | | |
|---|---|---|---|---|
| 5,774,667 | A * | 6/1998 | Garvey et al. | 709/222 |
| 6,012,090 | A * | 1/2000 | Chung et al. | 709/219 |
| 6,122,664 | A * | 9/2000 | Boukobza et al. | 709/224 |
| 6,339,750 | B1 * | 1/2002 | Hoyer et al. | 702/182 |
| 6,351,776 | B1 * | 2/2002 | O'Brien | 709/245 |
| 6,427,168 | B1 * | 7/2002 | McCollum | 709/224 |
| 6,449,739 | B1 * | 9/2002 | Landan | 714/47 |
| 6,470,386 | B1 * | 10/2002 | Combar et al. | 709/224 |
| 6,490,620 | B1 * | 12/2002 | Ditmer et al. | 709/224 |
| 6,549,612 | B1 * | 4/2003 | Gifford et al. | 379/67.1 |
| 6,587,866 | B1 * | 7/2003 | Modi et al. | 718/105 |
| 6,598,077 | B1 * | 7/2003 | Primak et al. | 709/219 |
| 6,654,796 | B1 * | 11/2003 | Slater et al. | 709/220 |

(Continued)

FOREIGN PATENT DOCUMENTS

EP 0 648 038 A2 * 8/1994

OTHER PUBLICATIONS

Brochure entitled "The Next Step in Server Load Balancing," Alteon Websystems, San Jose, CA, Nov. 1999.*

*Primary Examiner*—Jungwon Chang
(74) *Attorney, Agent, or Firm*—Leon R. Turkevich

(57) ABSTRACT

Host computers in a distributed open standards-based computing system are configured for performing application operations and management operations, including sending and receiving configuration management messages according to a web based protocol across an Internet Protocol. Each host computer includes an application resource configured for executing the corresponding application operations, for example initiating a unified messaging session for a unified messaging subscriber, providing text to speech services, providing short message service operations, etc., in response to an application request received from the open standards interface. Each host computer also includes a management resource configured for executing prescribed configuration management operations based on a corresponding received management command from the open standards interface. The received management command may be an application-generated command output by a management server executing a management application for a user, or a host-generated command output by a host computer in response to execution of a corresponding management operation. Hence, the execution of the management resource on each of the host computers in the distributed open standards-based computing system enables deployment of a web based arrangement for managing the host computers, where any host computer can send a request to another host computer during execution of the corresponding management operation.

39 Claims, 4 Drawing Sheets

U.S. PATENT DOCUMENTS

| | | | |
|---|---|---|---|
| 6,714,976 B1 * | 3/2004 | Wilson et al. | 709/224 |
| 6,714,979 B1 * | 3/2004 | Brandt et al. | 709/225 |
| 6,792,460 B1 * | 9/2004 | Oulu et al. | 709/224 |
| 6,807,565 B1 * | 10/2004 | Dodrill et al. | 709/206 |
| 6,892,236 B1 * | 5/2005 | Conrad et al. | 709/224 |
| 2002/0120727 A1 * | 8/2002 | Curley et al. | 709/223 |
| 2003/0014507 A1 * | 1/2003 | Bertram et al. | 709/223 |

* cited by examiner

WEB BASED MANAGEMENT OF HOST COMPUTERS IN AN OPEN PROTOCOL NETWORK

BACKGROUND OF THE INVENTION

1. Field of the Invention

The present invention relates to management of host computers in an open protocol network, for example management of host computers configured for providing respective functions as part of a unified messaging system.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

Unified communications systems are under development as a way of enhancing messaging services for users such as wireless telephone subscribers. A disadvantage of unified communications systems implemented as enhanced versions of the voice mail system, paging system, or e-mail interface resident within the wireless telephone communications system is that such implementation requires detailed knowledge of the proprietary protocols associated with the voice mail systems. Hence, such implementations are available only from switch vendors having knowledge of the proprietary protocols.

Use of a unified communications system implemented independent of the existing proprietary voice mail systems, such as the commercially-available Cisco Unified Open Network Exchange (Cisco uOne) (Products UONE-FOUND 4.1S, and UONE-VOICEMSG4.1S) from Cisco Systems, Inc., enables service providers to use scalable and distributed systems using recognized communication protocols. Hence, the service providers may use such unified communications systems across multiple platforms, independent of protocol, for storage of unified messages (carrying e.g., voice messages, facsimile, and/or e-mail) stored in a centralized messaging store or distributed message stores. In particular, such unified communications systems may transfer unified messages to message stores according to a prescribed open network protocol, for example IMAP protocol via the Internet.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

Hence, open network-based systems such as the commercially-available Cisco uOne system (4.1S) or the system disclosed in application Ser. No. 09/480,485 enable the use of open-network systems such as IMAP message stores, or LDAP directories accessible via an IP-based network such as the Internet, enabling worldwide deployment based on IP-based access protocols.

An important consideration in the deployment of open network-based systems for complex operations, such as unified messaging, is the ability to centrally manage the host computers that communicate amongst each other during execution of these complex operations. In particular, complex voice applications are composed of multiple distinct software components, often executed on separate host computers having a presence on the open network. Each software component requires a separate input configuration file configured for storing configuration attributes for the corresponding software component. Deployment of such complex voice applications on a network results in possibly hundreds of configuration files for the respective software components.

In addition, continued operations of the complex voice applications requires periodic management of the configuration files, including managing deployment specific data, backup and restoration operations, comparison of management information base data between host computers, etc. Consequently, management of these configuration files becomes substantially difficult, especially if certain management operations require that a system administrator access the configuration files locally at the host computer executing the respective software components.

SUMMARY OF THE INVENTION

There is a need for an arrangement that enables centralized management of software resources, configured for execution on respective host computers in a open standards protocol network, using a single one of the host computers. In particular, there is a need for an arrangement that enables the single host computer to manage the software resources by use of asynchronous commands that can be sent simultaneously and independently to any selected ones of the host computers.

There also is a need for an arrangement that enables management of a distributed open standards-based computing system, for example a unified messaging system, based on asynchronous communications between host computers and a primary host computer configured for executing a centralized management resource that sends and receives management messages to the host computers.

These and other needs are attained by the present invention, where each host computer in a distributed open standards-based computing system is configured for performing corresponding application operations and includes an open standards interface for sending and receiving configuration management messages according to a web based protocol. Each host computer includes an application resource configured for executing the corresponding application operations, for example initiating a unified messaging session for a unified messaging subscriber, providing text to speech services, providing short message service operations, etc., in response to an application request received from the open standards interface. Each host computer also includes a management resource configured for executing prescribed configuration management operations based on a corresponding received management command from the open standards interface. The received management command may be an application-generated command output by a management server executing a management application for a user, or a host-generated command output by a host computer in response to execution of a corresponding management operation. Hence, the execution of the management resource on each of the host computers in the distributed open standards-based computing system enables deployment of a web based arrangement for managing the host computers, where any host computer can send a request to another host computer during execution of the corresponding management operation, optimizing flexibility within the management arrangement while maintaining scalability of the management operations within the open standards-based computing system.

One aspect of the present invention provides a method in a server configured for providing web based management of host computers in communication via an open protocol network. The method includes first receiving, from a user, a web-based user request requiring execution of a management operation by at least one selected host computer, each host computer having an application resource for executing corresponding application operations and a management resource for executing the management operation. The method also includes first outputting to the at least one selected host computer a web request generated by the server based on executing the web-based user request, the web request specifying a management command for execution of the management operation by the management resource of the at least one selected host computer. The method further includes second receiving from the at least one selected host computer a web response that specifies information based on execution of the management operation, and second outputting to the user a web-based user response based on the web response. The outputting of the web request specifying a management command enables the server to simultaneously manage multiple host computers based on a user request. Hence, multiple host computers in a distributed system can be simultaneously and asynchronously managed, including organization and control of configuration data in each of the host computers, using a web based interface for a user such as a system administrator.

Another aspect of the present invention provides a server configured for providing web based management of host computers in communication via an open protocol network. The server includes a web based interface and an executable application. The web based interface is configured for receiving a web-based user request from a user and outputting a web page, and is also configured for outputting a web request to an identified host computer and receiving a web response from the identified host computer. The executable application is configured for identifying the identified host computer for execution of a management operation, necessary for generating the web page, in response to the web-based user request. The executable application generates within the web request an identifier that specifies execution of the management operation by a management resource within the identified host computer. The executable application also generates the web page based on results of execution of the management operation specified within the web response.

Still another aspect of the present invention provides a system configured for performing distributed computing operations. The system includes a plurality of host computers configured for communication via an Internet protocol (IP) network. Each host computer includes a web interface configured for sending and receiving web requests and web responses, a corresponding application resource configured for performing corresponding application operations, and a management resource. The management resource is configured for executing prescribed management operations in response to respective web requests received by the corresponding web interface. The management resource also is configured for outputting a web response that specifies results of execution of a selected management operation in response to a received web request. One of the host computers includes a web based management server resource as the corresponding application resource. The web based management server resource is configured for generating the web request for execution of the selected management operation by at least one selected host computer in response to reception of a web request from a user. The web based management server resource also is configured for outputting to the user a web-based user response based on the corresponding web response from the at least one selected host computer.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
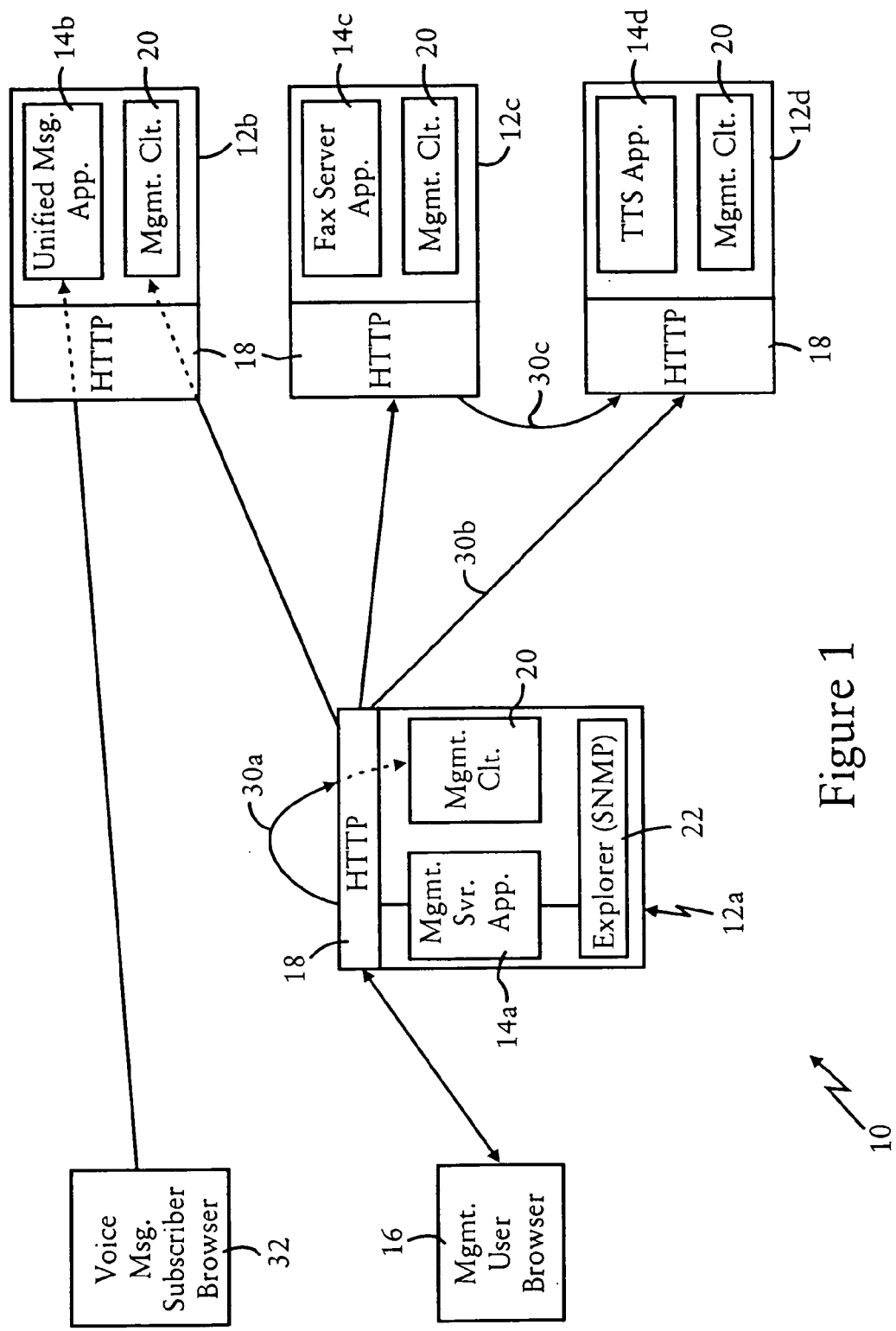
FIG. 1 is a block diagram illustrating an system enabling web based management of host computers configured for distributed computing operations for a unified messaging system, according to an embodiment of the present invention.

FIG. 1 is a block diagram illustrating a distributed computing system 10 that provides web-based management of host computers 12, configured for providing distributed application operations for unified voice messaging services via an IP network, according to an embodiment of the present invention. In particular, the distributed computing system 10 includes multiple host computers 12, each having a corresponding application resource 14 configured for executing prescribed application operations. For example, the host computer 12a includes a web based management server resource 14a that enables a management user 16 to centrally manage the host computers 12. The host computers 12b, 12c, and 12d include application resources 14b, 14c, and 14d configured for performing unified messaging sessions with a voice messaging subscriber 18, facsimile reception and transmission services, and text to speech services, respectively. Other host computers may be added to perform different operations (e.g., IMAP message storing, LDAP directory services, etc.), or to perform redundant operations for distributed or parallel processing.

Each host computer 12 also includes a web interface 18, and a management resource 20 configured for performing prescribed management operations. In particular, each management resource 20, also referred to as a thin management client, is configured for executing a selected management operation based on receiving a web request (i.e., accepting an HTTP Post operation) from the corresponding HTTP web interface 18 that specifies a management command for execution of the corresponding selected management operation. Upon completion of the selected management operation, the management resource 20 outputs a web response in the form of an HTTP Post that specifies the results of execution of the management operation. If necessary, the management resource 20 may generate its own web request for another management resource 20 executed by a remote host computer 12 to execute its own management operation. Hence, the use of HTTP Post operations between management resources 20 enables communication of management requests between the host computers 12.

The configuration files for each of the host computers 12 are centrally managed by the management user 16 sending user requests to the management server application 14a. The management server application 14a is configured for providing a web based management interface for the management user 16 by providing HTML web pages identifying the host computers 12, and the available management operations (e.g., modifying existing configuration files, write/transfer/backup/remove file, status requests, etc.), and generating HTTP requests to selected host computers for execution of selected management operations.

The management server application 14a is configured for determining the topology of the network 10 based on detecting the presence of the host computers 12 according to their respective host domain addresses. In particular, the management server application 14a accesses an explorer resource 22 configured for detecting a presence of the host computers 12 on the network 10, for example using SNMP (Simple Network Management Protocol). Once the topology of the network has been determined, the management server application 14a can provide HTML web pages that enable the management user 16 to select management operations that should be performed for a selected host computer 12. The management server application 14 in response sends a request via HTTP protocol for execution of the request by the selected host computer 12. Since the management client 20 receiving the request accepts the request as a Post operation, the management client 20 can accept commands that describe the action to be performed.

Hence, a management user 16 can manage complex configuration data of remote host computers 12 based on the use of a centralized management server application 14a, and the distributed management resources 20 serving as management clients that execute management operations based on a command language topology by which configuration data can be organized, backup, restored, and/or compared. Moreover, the disclosed arrangement can be used by a management user 16 to perform management evaluations of the network, for example measuring traffic flow patterns by requesting each host computer 12 to report back on load and traffic status, and the like.

Figure 2A:
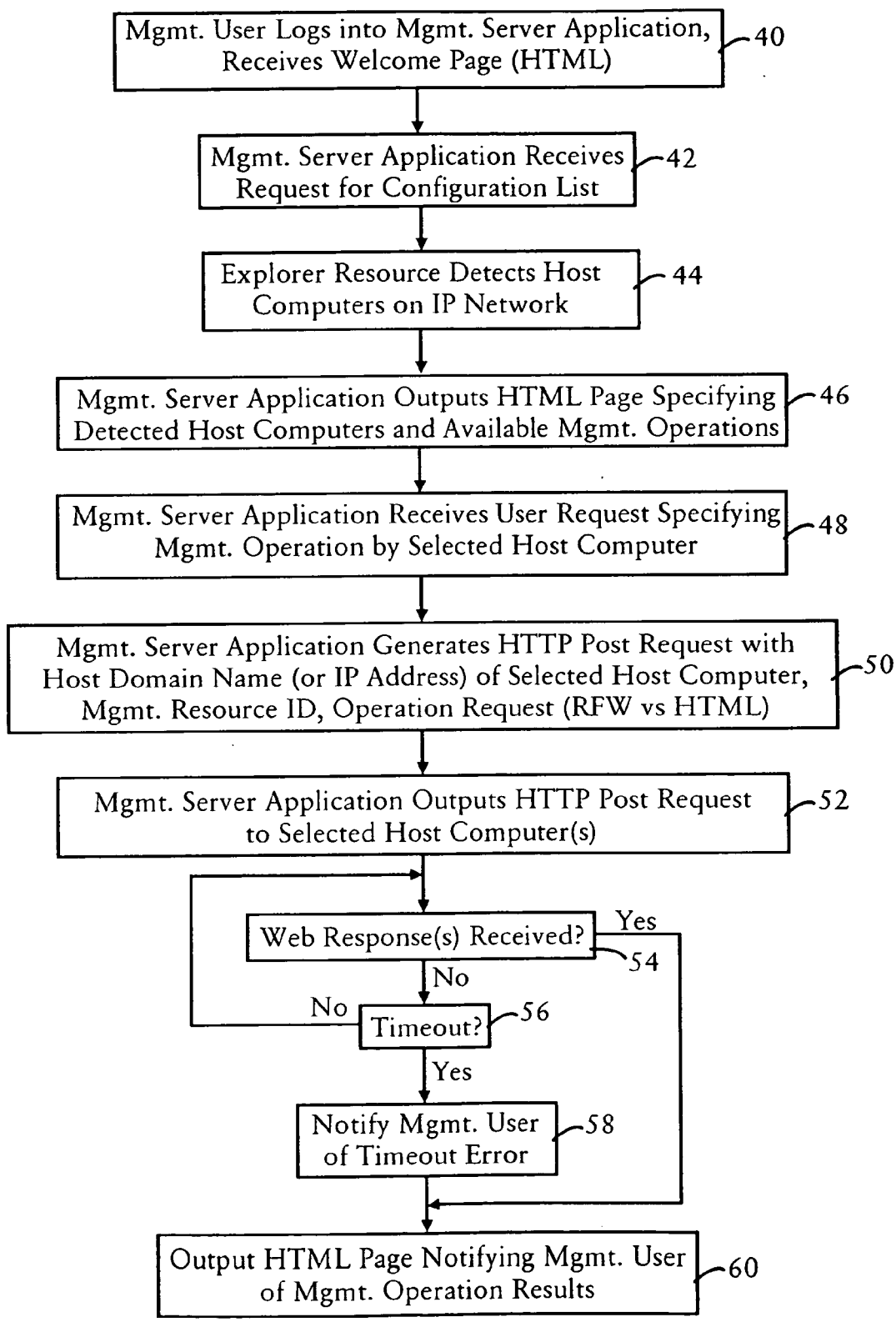
FIGS. 2A and 2B are diagrams summarizing the method of managing host computers by the management server resource and the management client resources, respectively, according to an embodiment of the present invention.
Figure 2B:
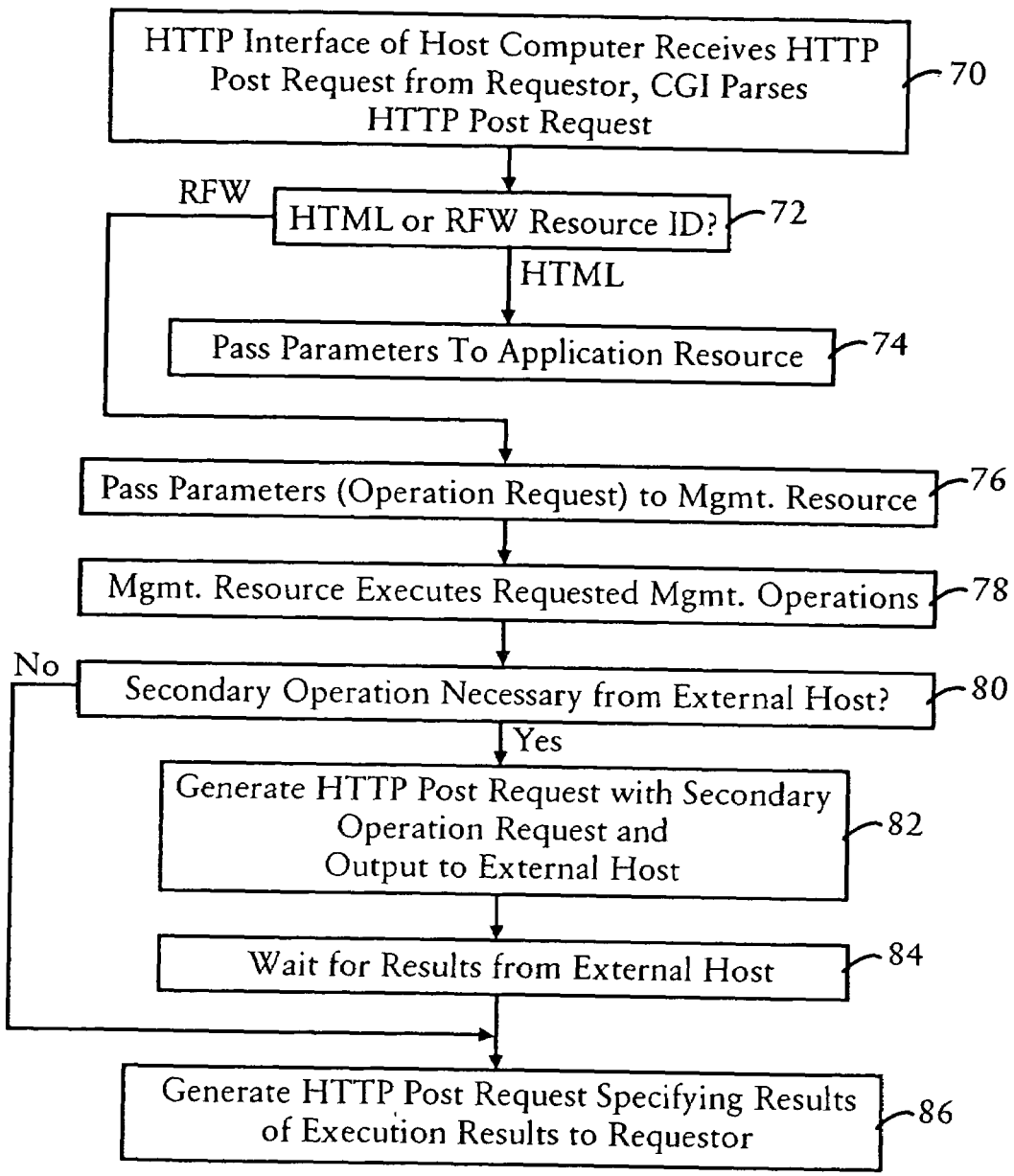
Figure 3:
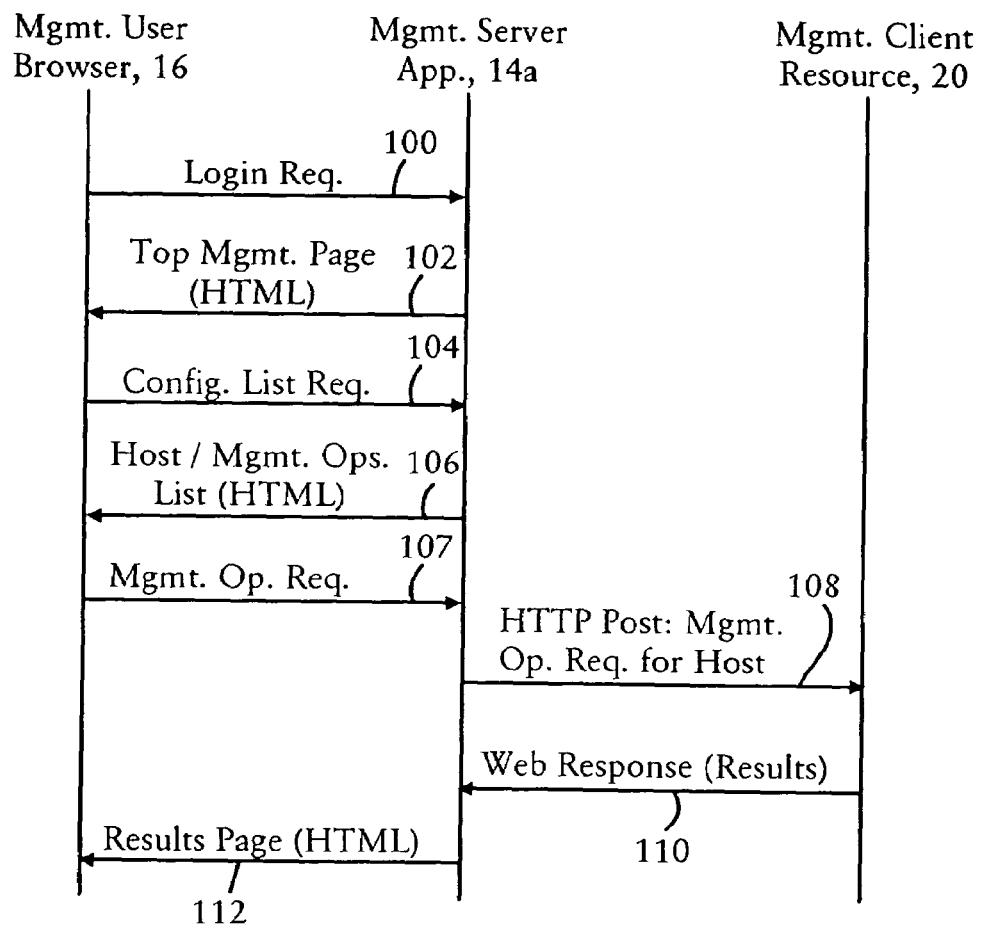
FIG. 3 is a diagram illustrating a sequence of web requests and responses transferred between host computers of the unified messaging system of FIG. 1 during execution of a web-based user request in FIGS. 2A and 2B.

FIGS. 2A and 2B are diagrams summarizing the method of centrally managing the host computers in an IP network based on a web based topology management, according to an embodiment of the present invention. FIG. 2A illustrates the steps performed by the management server application 14a, and FIG. 2B illustrates the steps performed by a management client 20 having received a web request, for example from the management server application 14a or another requesting client 20. The steps described in FIGS. 2A and 2B can be implemented as executable code stored on a computer readable medium (e.g., a hard disk drive, a floppy drive, a random access memory, a read only memory, an EPROM, a compact disc, etc.). FIG. 3 is a diagram illustrating a sequence of web requests and responses transferred between host computers of the unified messaging system of FIG. 1 during execution of a web-based user request in FIGS. 2A and 2B.

The method begins in step 40, where the management user 16 logs into the management server application 14a by sending a login request 100, causing the management server application 14a to output an HTML welcome page 102 including top level menu elements. The management user 16 navigates the HTML welcome page 102 and selects an option on the HTML page, causing the browser to send a web-based user request for a configuration list 104 to the management server application 14a.

In response to receiving in step 42 the web-based user request, for example a request for a configuration list 104, the management server application 14a invokes in step 44 the explorer resource 22 to obtain topology information on the network 10 by detecting the host computers 12 on the IP network. The management server application 14a generates in step 46 an HTML page 106 that specifies the detected host computers 12 and the available management operations, enabling the management user 16 to select any one of the host computers 12 (or any grouping thereof) and an associated configuration or management operation, including access and/or manipulation of a configuration file within any one of the host computers 12.

The management user 16 utilizes the browser to send a web based user request 107 that specifies a management operation for a selected host computer 12. The management server application 14a upon receiving the user request in step 48, generates in step 50 an HTTP Post request 108 including the network address of the selected host computer 12, a management resource identifier for invoking the corresponding management client 20, and the operation request that specifies the management operation to be performed. In particular, the management resource identifier (e.g., RFW) is used to specify that the HTTP Post request 108 is to be executed by the corresponding management resource 20, as opposed to the application logic 14 within the destination host computer 12. Hence, a destination host computer 12 can distinguish management operations from application operations (e.g., generating an HTML page for a voice messaging subscriber 32).

The management server application 14a outputs the HTTP Post request 108 in step 52 to the selected host computer(s) via the IP network 10, and waits in step 54 for a response 110. Note that the application instance 14a may actually wait for the response as a persistent application, alternately the management server application 14a may generate a server side data structure (e.g., a brownie) that identifies the application state and an expected results value to be received as a response from the destination host computer. If desired, a timeout mechanism may also be utilized in step 56 and step 58, although asynchronous events they have a relatively long timeout duration, for example 24 hours. Once the management server application 14a receives a response 110 in the form of an HTTP Post request from the management client 20, the management server application generates in step 60 an HTML page 112 that notifies the management user 16 of the management operation results. Note that for asynchronous events, the management server application 14a may notify the management client using a non session based message, for example a notification message using e-mail or SMS, etc.

FIG. 2B is a diagram illustrating the method by the management resource 20 of processing a received web request that specifies a management command for execution of a management operation, according to an embodiment of the present invention. The steps described with respect to FIG. 2B can be executed by any one of the management resources 20 within any one of the host computers 12; hence, the management server application 14a within the host computer 12a can send an HTTP Post request 108 to the management resource 20 resident within the same host computer 12a, indicated by the path 30a in FIG. 1. In addition, the management resource 20 of a remote host (e.g., 12d) can receive a web request from the server application 14a via path 30b, or from the management resource 20 of another host computer via path 30c.

The HTTP interface 18 of the destination host computer 12 receives the HTTP Post request 108 in step 70 (via paths 30a, 30b, or 30c), and invokes a common Gateway Interface (CGI) that parses the HTTP Post request. If the CGI determines in step 72 that the HTTP Post request 108 specifies an HTML resource identifier, the CGI passes the parameters of the HTTP Post request 108 to the application resource 14 in step 74 for application processing. However if the CGI determines that the HTTP Post request 108 specifies an RFW resource identifier, the CGI passes the parameters of the HTTP Post request 108 to the management resource 20 in step 76.

The management resource 20, upon receiving the parameters of the HTTP Post request 108 that specifies the management operation to be performed, initiates execution of the request management operations in step 78. If the management resource 20 determines in step 80 that additional (secondary) operations need to be executed by an external host 12, for example due to distribute processing, the management resource 20 generates a separate HTTP Post request 108 that specifies the secondary operation request, and outputs the separate HTTP Post request in step 82 using the path 30c illustrated in FIG. 1. Note that the process of sending separate HTTP Post requests 108 to different host computers may be propagated throughout the network as necessary, so long as each management client 20 that sends an HTTP Post request is able to recognize the host computers 12 that need to be accessed.

The management resource 20 waits for the results from the external host in step 84, if necessary, and generates in step 86 an HTTP Post request 110 that specifies the results of the execution results to the requester (e.g., the management server application 14a or any intermediate management client 20 having sent the request).

According to the disclosed embodiment, a centralized server application can communicate requests to multiple hosts asynchronously as separate client requests. As the request and actions are completed, individual status data may be interpreted and translated for end-user evaluation and response. Hence, a management user 16 can locally or remotely manage complex configuration data based on using a central server application 14a and distributed management clients 20 in conjunction with a command language topology that enables a scalable and sophisticated management of the entire network 10.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a host computer comprising a server configured for providing web based management of host computers in communication via an open protocol network, the method comprising:

first receiving, by the server and from a user browser according to hypertext transport protocol (HTTP), a web-based user request specifying execution of a management operation by at least one selected host computer specified in the web-based user request, each host computer having an application resource for executing corresponding application operations and a management resource for executing the management operation, the application resource of said host computer having received the web-based user request being said server;

first outputting from the server to the corresponding management resource of the at least one selected host computer a web request generated by the server based on executing the web-based user request, the web request implemented as a first HTTP Post and specifying a management command for execution of the management operation by the management resource of the at least one selected host computer;

second receiving by the server from the corresponding management resource of the at least one selected host computer a web response implemented as a second HTTP Post and that specifies information based on execution of the management operation; and second outputting by the server to the user browser a web-based user response based on the web response.

2. The method of claim 1, further comprising detecting a presence of the host computers on the open protocol network.

3. The method of claim 2, further comprising third outputting by the server to the user browser a web page that specifies the host computers and available management operations for the host computers, the first receiving step further including receiving the web-based user request as an HTTP post having request information based on a user selection from the web page having been output to the user browser.

4. The method of claim 1, wherein the first outputting step includes inserting within the web request an identifier specifying execution by the management resource within the at least one selected host computer.

5. The method of claim 4, wherein the first outputting step further includes specifying at least one of a backup operation, a file transfer operation, and a status report operation as the management operation.

6. The method of claim 5, wherein the second receiving step includes receiving at least one of a backup acknowledgment, a transferred file, and a status report in response to the management operation specifying at least one of a backup operation, a file transfer operation, and a status report operation, respectively.

7. The method of claim 1, wherein the at least one selected host computer is said host computer comprising the server as the corresponding application resource and having received the web-based user request, the first outputting step includes outputting the web request to an HTTP interface within the host computer comprising the server.

8. The method of claim 7, further comprising:

third receiving the web request from the HTTP interface by the corresponding management resource of the host computer comprising the server;

executing the management operation specified by the web request by the management resource of the host computer comprising the server; and third outputting to the HTTP interface, by the management resource of the host computer comprising the server, the web response that specifies the information based on execution of the management operation.

9. The method of claim 8, further comprising:

generating by the management resource of the host computer comprising the server a second web request as a third HTTP Post for execution of a second management operation by at least a second host computer of the open protocol network, the second management operation necessary for execution of the management operation;

fourth outputting the second web request by the management resource of the host computer comprising the server to the at least second host computer; and fourth receiving by the management resource of the host computer comprising the server from the at least second host computer a second web response as a fourth HTTP Post that specifies information based on execution of the second management operation, the web response generated based on the second web response.

10. A host computer configured for providing web based management of host computers in communication via an open protocol network, the host computer comprising:

a web based interface configured for receiving a web-based user request from a user browser according to hypertext transport protocol (HTTP) and outputting a web page, the web based interface configured for outputting a web request implemented as a first HTTP Post to an identified host computer and receiving a web response implemented as a second HTTP Post from the identified host computer; and an executable server application configured for identifying the identified host computer specified in the web-based user request for execution of a management operation specified in the web-based user request and necessary for generating the web page in response to the web-based user request, the executable server application generating within the web request an identifier that specifies execution of the management operation by a management resource within the identified host computer, the executable server application generating the web page based on results of execution of the management operation specified within the web response.

11. The host computer of claim 10, further comprising a software resource configured for detecting a presence of the host computers on the open protocol network.

12. The host computer of claim 11, wherein the executable server application specifies within the web page the host computers and available management operations for the host computers.

13. The host computer of claim 10, wherein the executable server application specifies within the web request at least one of a backup operation, a file transfer operation, and a status report operation as the management operation.

14. The host computer of claim 10, further comprising a second management resource configured for executing a specified management operation in response to a second web request received by the web based interface as a third HTTP Post, the second management resource configured for outputting to the web based interface a second web response implemented as a fourth HTTP Post and that specifies second results of execution of the corresponding specified management operation specified by the second web request.

15. The host computer of claim 14, wherein the identifier in the second web request specifies the second management resource executed within the host computer.

16. The host computer of claim 14, wherein the executable server application and the second management resource each are configured for selectively responding to an HTTP request received by the web based interface based on a corresponding identifier within the HTTP request.

17. A system configured for performing distributed computing operations, the system comprising:

a plurality of host computers configured for communication via an Internet protocol (IP) network, each host computer including:

(1) a web interface configured for sending and receiving web requests and web responses, (2) a corresponding application resource configured for performing corresponding application operations, and (3) a management client resource configured for executing prescribed management operations in response to respective web requests received as respective first hypertext transport protocol (HTTP) Posts by the corresponding web interface, the management client resource configured for outputting a web response as a second HTTP Post and that specifies results of execution of a selected management operation in response to a received web request implemented as a corresponding one of the first HTTP Posts;

wherein the application resource of one of the host computers is implemented as a web based management server resource configured for: (1) generating the web request as the corresponding first HTTP Post for execution of the selected management operation by at least one selected host computer in response to reception from a user browser of a web request according to HTTP that specifies the selected management operation and the at least one selected host computer, and (2) outputting to the user browser a web-based user response based on the corresponding web response, implemented as the corresponding second HTTP post, from the at least one selected host computer.

18. The system of claim 17, wherein the one host computer further includes a software resource configured for detecting a presence of the host computers on the IP network.

19. The system of claim 18, wherein the web based management server resource is configured for generating for the user browser a web page that specifies the host computers and available management operations for the host computers, the web request from the user browser including information based on a user selection from the web page.

20. The system of claim 19, wherein the web based management server resource specifies within the web request at least one of a backup operation, a file transfer operation, and a status report operation as the management operation.

21. The system of claim 17, wherein each management client resource is configured for generating a second web request as a third HTTP Post to a management client resource of another one of the host computers for execution of a second management operation necessary for execution of the corresponding management operation by said each management client resource, said another one of the host computers executing the second management operation in response to the second web request and returning to said each management client resource a corresponding web response implemented as a fourth HTTP Post and that specifies information based on execution of the second management operation.

22. A computer readable medium having stored thereon sequences of instructions for providing web based management of host computers in communication via an open protocol network, the sequences of instructions including instructions for performing the steps of:

first receiving, from a user browser and by a server executed in one of the host computers, a web-based user request according to hypertext transport protocol (HTTP) and specifying execution of a management operation by at least one selected host computer specified in the web-based user request, each host computer having an application resource for executing corresponding application operations and a management resource for executing the management operation, the application resource of said host computer having received the web-based user request being said server;

first outputting from the server to the corresponding management resource of the at least one selected host computer a web request generated by the server based on executing the web-based user request, the web request implemented as a first HTTP Post and specifying a management command for execution of the management operation by the management resource of the at least one selected host computer;

second receiving by the server from the corresponding management resource of the at least one selected host computer a web response implemented as a second HTTP Post and that specifies information based on execution of the management operation; and second outputting by the server to the user browser a web-based user response based on the web response.

23. The medium of claim 22, further comprising instructions for performing the step of detecting a presence of the host computers on the open protocol network.

24. The medium of claim 23, further comprising instructions for performing the step of third outputting by the server to the user browser a web page that specifies the host computers and available management operations for the host computers, the first receiving step further including receiving the web-based user request as an HTTP post having request information based on a user selection from the web page having been output to the user browser.

25. The medium of claim 22, wherein the first outputting step includes inserting within the web request an identifier specifying execution by the management resource within the at least one selected host computer.

26. The medium of claim 25, wherein the first outputting step further includes specifying at least one of a backup operation, a file transfer operation, and a status report operation as the management operation.

27. The medium of claim 26, wherein the second receiving step includes receiving at least one of a backup acknowledgment, a transferred file, and a status report in response to the management operation specifying at least one of a backup operation, a file transfer operation, and a status report operation, respectively.

28. The medium of claim 22, wherein the at least one selected host computer is said one host computer executing the server as the corresponding application resource and having received the web-based user request, the first outputting step includes outputting the web request to an HTTP interface within the one host computer executing the server.

29. The medium of claim 28, further comprising instructions for performing the steps of:

third receiving the web request from the HTTP interface by the corresponding management resource of the one host computer executing the server;

executing the management operation specified by the web request by the management resource of the one host computer executing the server; and third outputting to the HTTP interface, by the management resource of the one host computer executing the server, the web response that specifies the information based on execution of the management operation.

30. The medium of claim 29, further comprising instructions for performing the steps of:

generating by the management resource of the one host computer executing the server a second web request as a third HTTP Post for execution of a second management operation by at least a second host computer of the open protocol network, the second management operation necessary for execution of the management operation;

fourth outputting the second web request by the management resource of the one host computer executing the server to the at least second host computer; and fourth receiving by the management resource of the one host computer executing the server from the at least second host computer a second web response as a fourth HTTP Post that specifies information based on execution of the second management operation, the web response generated based on the second web response.

31. A host computer configured for providing web based management of host computers in communication via an open protocol network, the host computer comprising:
   means for first receiving, from a user browser according to hypertext transport protocol (HTTP), a web-based user request specifying execution of a management operation by at least one selected host computer specified in the web-based user request, each host computer having an application resource means for executing corresponding application operations and a management resource means for executing the management operation;
   server means as the corresponding application resource means, the server means configured for first outputting to the at least one selected host computer a web request implemented as a first HTTP Post and generated by the server means based on executing the web-based user request, the web request specifying a management command for execution of the management operation by the management resource means of the at least one selected host computer;
   the means for first receiving the web-based user request configured for second receiving from the at least one selected host computer a web response implemented as a second HTTP Post and that specifies information based on execution of the management operation; and
   the server means configured for second outputting to the user browser a web-based user response based on the web response.

32. The host computer of claim 31, further comprising means for detecting a presence of the host computers on the open protocol network.

33. The host computer of claim 32, wherein the server means is configured for third outputting to the user browser a web page that specifies the host computers and available management operations for the host computers, the first receiving means configured for receiving the web-based user request as an HTTP post having request information based on a user selection from the web page having been output to the user browser.

34. The host computer of claim 31, wherein the server means is configured for inserting within the web request an identifier specifying execution by the management resource within the at least one selected host computer.

35. The host computer of claim 34, wherein the server means is configured for specifying at least one of a backup operation, a file transfer operation, and a status report operation as the management operation.

36. The host computer of claim 35, wherein the first receiving means is configured for receiving at least one of a backup acknowledgment, a transferred file, and a status report in response to the management operation specifying at least one of a backup operation, a file transfer operation, and a status report operation, respectively.

37. The host computer of claim 31, wherein the at least one selected host computer is said host computer comprising the server means as the corresponding application resource means and having received the web-based user request.

38. The host computer of claim 37, wherein:
   the corresponding management resource means is configured for third receiving the web request, executing the management operation specified by the web request by the management resource of the server, and outputting to the first receiving means the web response that specifies the information based on execution of the management operation.

39. The host computer of claim 38, wherein the management resource means further is configured for:
   generating a second web request as a third HTTP Post for execution of a second management operation by at least a second host computer of the open protocol network, the second management operation necessary for execution of the management operation;
   outputting the second web request by the management resource of the server to the at least second host computer; and
   receiving from the at least second host computer a second web response as a fourth HTTP Post and that specifies information based on execution of the second management operation, the web response generated based on the second web response.

* * * * *